United States Patent [19]
Laing

[11] 3,799,629
[45] Mar. 26, 1974

[54] BEARINGS WITH COMPOSITE SURFACES

[76] Inventor: Nikolaus Laing, Hofener Weg 35-37, 7141 Aldingen near Stuttgart, Germany

[22] Filed: June 25, 1971

[21] Appl. No.: 156,896

[30] Foreign Application Priority Data
July 1, 1970 Australia............................. 5900/70

[52] U.S. Cl.................... 308/9, 29/149.5, 308/72, 308/239
[51] Int. Cl. ........................................... F16c 17/16
[58] Field of Search ................ 308/239, 240, 9, 72; 204/143 R; 29/149.5

[56] References Cited
UNITED STATES PATENTS

| | | | |
|---|---|---|---|
| 3,247,080 | 4/1966 | Blumenfeld et al.................... | 308/9 |
| 3,154,353 | 10/1964 | Haringx et al......................... | 308/9 |
| 2,558,504 | 6/1951 | Aller................................. | 204/143 R |
| 2,869,266 | 1/1959 | Hirdler, Jr......................... | 204/143 R |
| 3,591,473 | 7/1971 | Haggerty........................ | 204/143 R |
| 3,594,134 | 7/1971 | Russel et al..................... | 204/143 R |

Primary Examiner—Charles J. Myhre
Assistant Examiner—Barry Grossman

[57] ABSTRACT

The present invention is concerned with plain bearings, i.e. those bearings which have complementary running surfaces. It is deemed to be applicable with special advantage to spherical bearings or others having concave/convex or conical surfaces, such as are particularly useful with magnetically sustained rotating bodies.

7 Claims, 4 Drawing Figures

BEARINGS WITH COMPOSITE SURFACES

DESCRIPTION OF THE INVENTION

Spherical bearings, e.g. for pumps, are known to have been designed to operate with semi-dry friction. Such bearings are also known, in which a hydrodynamically sustaining liquid film is conveyed inwards through spiral or spiro-helic grooves. Such bearings have the advantage that they operate without solid contact but many have the drawback of poor fail-safe capabilities. It is regarded as advantageous to provide bearings which combine the favourable normal operating qualities of a grooved bearing surface with the good fail-safe capabilities of smooth surfaced bearings. The invention aims at providing bearings having this combination of properties. According to the invention, a surface of a plain bearing is provided with circumferentially alternating different materials, preferably two such materials. By a suitable choice of materials, adequate performance can be obtained in emergency or "fail-safe" operation, and normal operation.

Usually the convex spherical bodies of bearing, with which the invention is concerned, are balls which, preferably at least at their surface, are made of or are surfaced with sintered ceramics or are of hard metals. It has been found advantageous to provide the surface with a roughness of not less than a value of 0.2 microns so that the liquid film is not broken. According to one aspect of the invention this roughness is achieved by electro-chemical removal processes, electrical erosion processes, chemical etching, or surface treatment which, similarly, removes minute particles of material whilst leaving none resistant particles.

Suitable combinations of material for bearing surface according to the invention are the following. Metal and resin; ceramics and metal; two ceramics of different hardness; carbon in combination with soft materials (e.g. elastomeric materials) which can also be combined with all other hard materials.

The alternations of the surface can be made in the form of segments with interfaces along meridians. This is advisable when operation is in a plurality of planes of rotation. For operation in a single plane of rotation the seperating lines between the two materials are, preferably, not meridians but are spiro-helical lines, that is to say they wind circumferentially along the spherical surface between a lesser and a greater diameter.

A difference in the wear and corrosion resistance, or broadly erosion resistant, between the materials is essential for the choice of materials. Bearing surfaces of two metals with different solution pressures are, however, preferably used when the bearing is to run in non-conducting solutions. After the manufacture and machining of the part, according to a further feature of the invention, partial removal of the more easily wearing component is carried out by abrasion, e.g. by sand blasting with very fine grained sand or by brushing with metal wire brushes. Such processes result in shallow recesses which ensure the presence in operation of hydrodynamically sustained load-supporting liquid film. In use the material of these more easily worn regions is more rapidly removed by abrasive solid particles carried in the liquid than that of the more upstanding alternate material between the recesses, so that the hydrodynamic effect is continuously maintained even after general wear. Instead of abrasive removal to create the recesses, physical, electrical, or chemical processes such as etching, spark-erosion, ultrasonic energy, or electro-chemical removal may be used, all of which processes are forms of erosion.

DETAILED DESCRIPTION OF THE PREFERRED EMBODIMENTS

Figure 1:
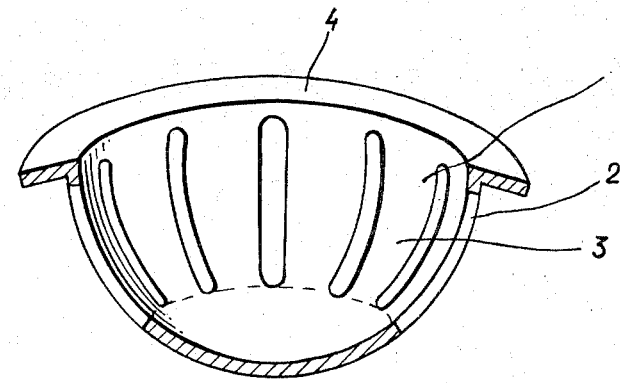
FIG. 1 illustrates in section a bearing element constructed according to the invention.

In FIG. 1, the cup of a spherical bearing consists of a concave body or bearing element 1 which can, for example, be made as a deep-drawn component of bearing bronze. In the spherical region, apertures 2 are arranged which follow meridians. In a variant they follow spiro-helical lines. The apertures 2 are filled in this example with white metal which has less erosion resistant properties than the bronze. Alternately between the apertures 2 are lands 3 which comprise a bearing surface; the body has a peripheral flange 4.

Other materials, like carbon, graphite, ceramics or resins may be used for the body 1 or bearing element whilst materials such as cast synthetic resinous substance, thermoplastic resinous substance or ceramic substance may replace white metal in the aperture 2.

The minute depth of recess necessary to create the desired hydrodynamic effect is obtained by a method such as described above, e. g. abrasion.

Figure 2:
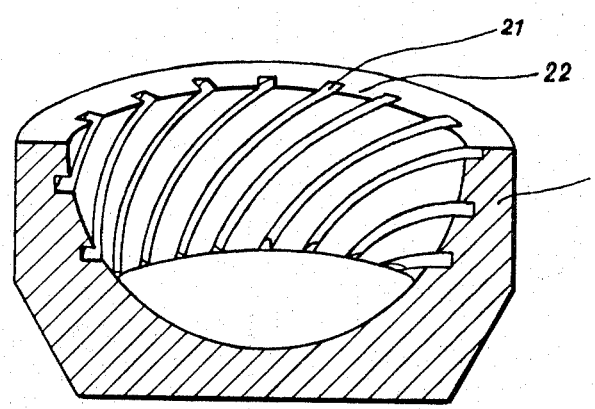
FIG. 2 illustrates in section a further embodiment of a bearing element constructed according to the invention.

FIG. 2 shows another embodiment of the invention. In this case the body or bearing element 20 is made as a moulded component of synthetic resin, a carbon-type material (such as used for brushes) or a sintered ceramic. Grooves 21 follow spiro-helical lines. In manufacture this is done by using a male mould which is allowed to rotate during ejection of the material of the body 20. The grooves 21, having been formed by moulding, are filled with the second material having the low erosion resistant properties. With sintered materials this may be accomplished prior to sintering: such may be the case when the combination of a metal oxide and a carbon-type material is used. Suitable material pairs consist of PTFE impregnated with carbon or graphite for the material of the body 20 and a phenolic resin, preferably with graphite filling for filling the grooves by injection into the fully hardened PTFE part. Another suitable pair of materials is a high-purity sintered corundum or sintered ruby for the body 20 and, for example, a silicon dioxide containing sintered corundum, or a chemically resistant material of low hardness such as an acid-resisting putty, for filling the groove 21.

Figure 3:
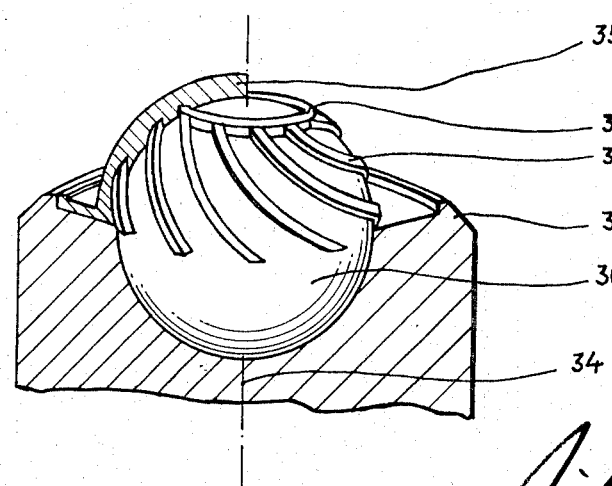
FIG. 3 illustrates a manner in which a bearing element according to the invention may be constructed.

FIG. 3 shows, diagrammatically, one operation of the manufacturing process for making another variant of the invention. A fashioned component consisting of a ring 32 and spiro-helically shaped arms 33 extending from it in the manner illustrated is placed on a ball 30. The mould 31 is then made to rotate about the axis 34. A body 35, preferably of molybdenum, (of which only one half is shown) is deposited on such assembly by means of a flame or plasma spray process or else by other known casting or spraying processes. Tungsten or titanium carbides are also suitable to form the body 35 by deposition by plasma or flame spraying processes, particularly if the ball 30 is of sintered ceramic. Chromium nickel alloys, or, for extremely high chemical resistance requirements, platinum, have been found successful as a matrix.

The fashioned component 32, 33 can also be made by covering the ball 30 with a mask which permits the impingement of the plasma jet on to the ball solely along the ring 32 and the arms 33. The following combinations are particularly suitable:

Nickel for the ring 32 and molybdenum for the body 35 and also for the arms 33.

Tungsten carbide in a chromium nickel matrix for the body 35 and gold for the arms 33.

Tungsten carbide in a platinum matrix for the body 35 and silicon dioxide containing sintered corundum for the arms 33 or else a magnesium oxide based ceramic substance and high-purity sintered corundum for the layer 35.

Sintered corundum for the arms 33 and tungsten carbide in a metal matrix for the body 35.

Figure 4:
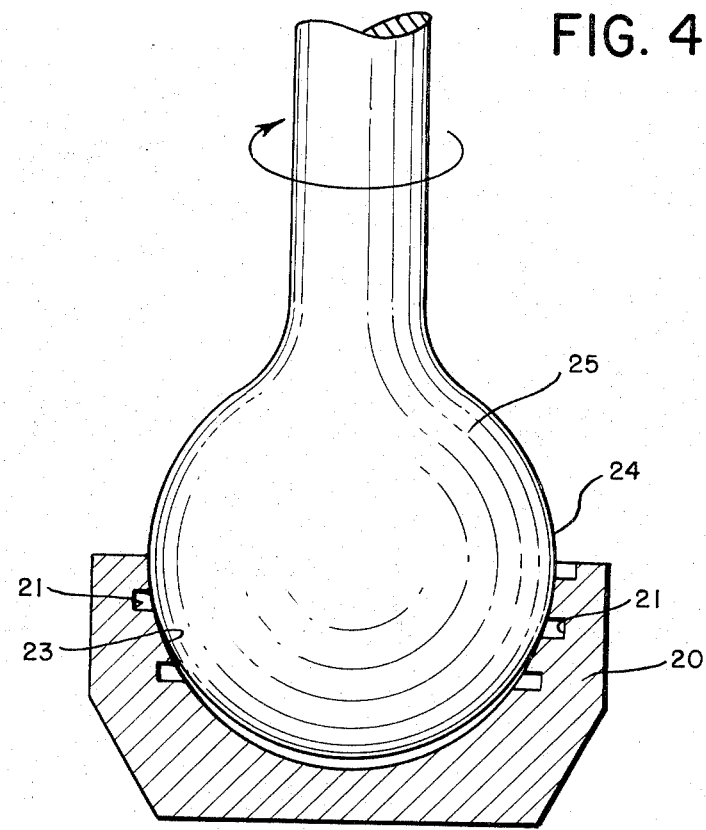
FIG. 4 illustrates in section a bearing assembly utilizing a bearing element of the form shown in FIG. 2.

FIG. 4 illustrates a bearing assembly utilizing the bearing element 20 of FIG. 2. In this instance the bearing element 20 has thereon bearing surface 23 adapted to engage complementary surface 24 of a second bearing element 25 when the bearing assembly is at rest. A fluid lubricant is adapted to be contained in the bottom portion of the element 20 such that when the element 24 rotates relative to element 20, the grooves 21 will form a thin hydrodynamic film which will support the two bearing elements with respect to each other. As the complementary bearing surfaces 23 and 24 physically contact each other when the bearing assembly is at rest or during start-up or shut-down, the bearing surface 23 will tend to wear away which, if no provision were made, would result in the grooves 21 becoming more shallow, or even wearing away completely. However, as the bottom of the grooves comprises a material which erodes faster than the material comprising the bearing surface 23, the bottom of the grooves will erode away due to hydrodynamic forces. This assures that as the bearing pressure surfaces 23 wear down, the bottom of the grooves will likewise erode away thereby maintaining the depth of the grooves despite wear of the pressure surfaces.

The present invention is not confined to spherical bearing shells but can also be used in flat thrust pads for thrust bearings in tapered bearings and others in which similar hydrodynamic effects can be achieved.

I claim:

1. A first bearing element of a hydrodynamic bearing assembly comprising first and second bearing elements having complementary bearing surfaces adapted to engage each other when the bearing is at rest and adapted to be supported relative to each other by a hydrodynamic pressure film when said bearing assembly is running, the improvement comprising in that the bearing surface of said first element has circumferentially spaced grooves thereon for forming said hydrodynamic pressure film where the bottom of said grooves comprises an erodable material which is subjected to erosion by hydrodynamic forces, and in that the portion of said bearing surface between said grooves comprises a wearable material having greater erosion resistant properties than said erodable material whereby during operation of said bearing assembly the bottom of said grooves will erode away at a greater rate under the influence of hydrodynamic forces than the wearable material comprising said first bearing surface will erode away or wear away due to contact with the bearing surface of said second element thereby maintaining the depth of said gooves independent of wear of said first bearing surface.

2. A first bearing element according to claim 1 wherein said first bearing surface is spherical and wherein said grooves are in the configuration of meridians.

3. A first bearing element according to claim 1 wherein said first bearing surface is spherical and wherein said grooves extend helically with respect to said first bearing surface.

4. A method of making a surface on a bearing element wherein said surface comprises a first material and grooves in said surface where the bottom of each groove comprises a second material, comprising the steps of forming on a surface of revolution circumferentially alternatively spaced areas of a first material, providing a second material in the spaces between the areas of said first material where said second material has less erosion resistance than said first material, and subjecting said second material to an erosion process to remove portions of said second material to a level below said first material whereby grooves are formed in said surface.

5. A method according to claim 4 wherein said erosion process comprises an abrasive treatment.

6. A method according to claim 4 wherein said erosive process comprises a chemical treatment.

7. A method according to claim 4 wherein said second material prior to the erosion process is in the form of a ring having spherical shaped helical arms extending therefrom and where the steps of forming the surface includes positioning said ring and attached helical arms into a chamber formed between convex and concave shaped matching mold members and introducing said first material in molten form into said chamber.

* * * * *